Figure 1:
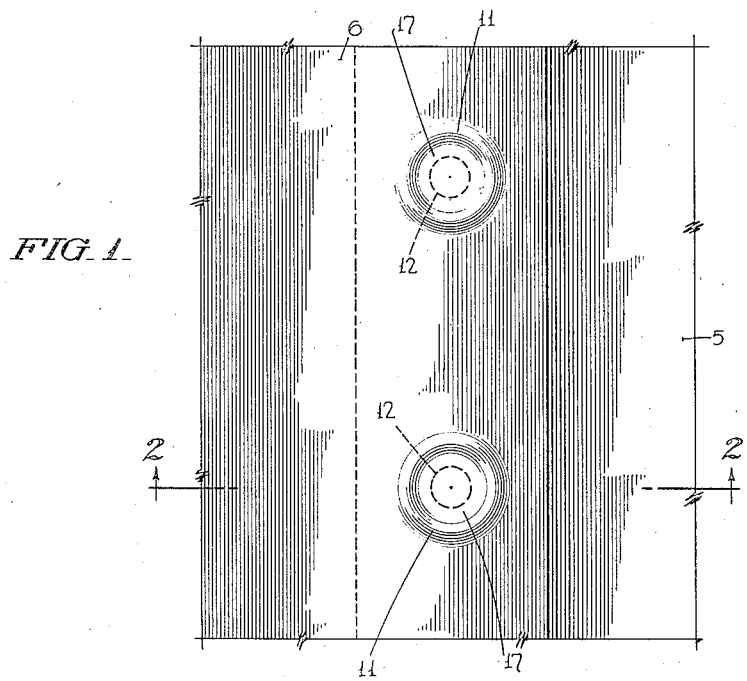

Dec. 3, 1946.    E. T. RIDGWAY    2,412,175

SPOT WELDING

Filed Oct. 26, 1943

INVENTOR
Edmund T. Ridgway
BY John P. Tarbot
ATTORNEY

Patented Dec. 3, 1946

2,412,175

UNITED STATES PATENT OFFICE 2,412,175

SPOT WELDING

Edmund T. Ridgway, Oaklyn, N. J., assignor to The Budd Company, Philadelphia, Pa., a corporation of Pennsylvania Application October 26, 1943, Serial No. 507,659

2 Claims. (Cl. 219—10)

The invention relates to electric spot welding, and more particularly to spot welds with increased fatigue resistance at the weld location and its surroundings.

The invention is concerned with the stresses concentrated at and around spot welds, especially in highly stressed structures which have been a serious problem. These stresses are due to the expansion of the material of the weld nugget during the welding operation and the later contraction thereof after its solidification. It was found that, due to these stresses and probably due to the irregular shape of the weld nugget in the zone where the members to be united meet, fissures or cracks occur which start at the weld and which extend gradually into the surrounding material until the structure is weakened to such an extent that repair or replacement becomes necessary.

The outstanding object of the invention is the overcoming of these serious defects.

The object of the invention is mainly achieved by providing a ring-shaped bead, groove or ridge in the metal part or parts around the spots to be welded. Applicant's explanations of the functions of this bead or the like will be given later on after having described the embodiment illustrated in the attached drawing.

Figure 2:
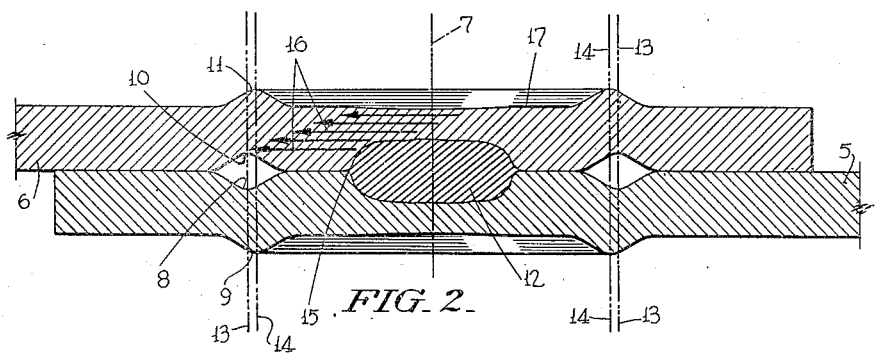

In the drawing:

Figure 1 is a fragmentary view of two metal sheets with two weld connections according to the invention; and Figure 2 is a section through the center of one weld along line 2—2 of Figure 1.

The drawing shows two sheet metal parts 5, 6 which overlap each other. The dot-and-dash line 7 indicates the axis of the weld to be described in the following.

Sheet 5 is formed with an annular groove 8 on one side and an annular ridge 9 on the other side, both concentrically about the axis 7 of each weld. Groove 8 and ridge 9 are formed with correspondingly shaped dies. Similar groove 10 and ridge 11 are formed on sheet 6. The weld nugget 12 is formed in substantially conventional manner and by substantially conventional means in the space surrounded by said grooves and ridges 8, 10 and 9, 11.

The rings raised above the one surface of each sheet and marked by said grooves 8, 10 and ridges 9, 11 produce a small amount of initial compression in the circle in which the weld nugget is formed and this compression counteracts the shrinkage in the weld nugget which, as explained hereinbefore, is believed to be the main cause for the start of fatigue failure. The dies forming the rings should, therefore, be shaped and used so as to achieve the proper amount of compression. Helpful in obtaining the desired compression is the offset arrangement of the center of the middle line 13 of the grooves 8, 10 slightly outside of the middle line 14 of the ridges 9, 11, as shown in Figure 2.

The rings or beads help, furthermore, in achieving the desired object by leading the stresses away from the rough edge 15 of the weld nugget 12 and, as indicated by the arrows 16, over the grooves. This avoids concentration of stresses at the meeting faces and on the irregular edge of the weld nugget 12 where a notch effect occurs through irregular fusion or splashing of the weld.

A further beneficial influence of said rings is due to the fact that they produce a dead end or retardant if a crack or fissure should start at the weld.

Finally, the rings or beads stiffen the area around the weld and reduce bending of the inside portion 17 comprising the weld nugget so that the weld nugget is relieved from stress concentrations.

The outside ridge or ridges 9, 11 may perform an additional function, namely that of facilitating the matching of parts and the location of the welds. When two pieces are to be connected and the rings or beads indicating the weld pattern have been made in advance, the smooth sides may match and the projecting beads on the rough side will serve as a locating means when welding.

The invention is, of course, liable to many modifications which will occur to those skilled in the art, and which are intended to be covered by the attached claims.

What is claimed is:

1. Method of making a spot weld connection, comprising the step of forming an enclosing bead in at least one of the members to be united and in simultaneously compressing the material surrounded by said bead, and the further step of producing a weld in the central portion only of the region surrounded by the bead in such a manner that compressive forces in the material around said weld are substantially neutralized.

2. Method of making a spot weld connection between parts, comprising the steps of forcing the material of at least one of the parts radially and inwardly toward a central weld area to form a section under compression and welding a nugget in substantially the central portion of said compression section only whereby the compressive forces in the compressed section of the material external to the weld are neutralized.

EDMUND T. RIDGWAY.